US007543228B2

(12) United States Patent
Kelkar et al.

(10) Patent No.: US 7,543,228 B2
(45) Date of Patent: Jun. 2, 2009

(54) TEMPLATE FOR RENDERING AN ELECTRONIC FORM

(75) Inventors: Amol S. Kelkar, Redmond, WA (US); Danny van Velzen, Redmond, WA (US); Jonathan E. Rivers-Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 11/167,514

(22) Filed: Jun. 27, 2005

(65) Prior Publication Data

US 2006/0294451 A1    Dec. 28, 2006

(51) Int. Cl.
G06N 3/00    (2006.01)
(52) U.S. Cl. ...................................... 715/234
(58) Field of Classification Search .............. 715/513, 715/517, 523, 530, 234, 243, 254, 255, 200, 715/223
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,933,880 A | 6/1990 | Borgendale et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |
| 5,206,951 A | 4/1993 | Khoyi et al. | |
| 5,218,672 A | 6/1993 | Morgan et al. | |
| 5,220,649 A | 6/1993 | Forcier | |

(Continued)

FOREIGN PATENT DOCUMENTS

EP    0841615    11/1999

(Continued)

OTHER PUBLICATIONS

Kay, Michael, "XSL Transformations (XSLT) Version 2.0," Apr. 4, 2005, W3C, available at <http://www.w3.org/TR/2005/WD-xslt20-20050404/> pp. 1-374.*

(Continued)

*Primary Examiner*—Stephen S Hong
*Assistant Examiner*—Kyle R Stork

(57) ABSTRACT

Systems and/or methods are described that enable an electronic form to be rendered using a template. The template may be independent of the electronic form's current state or instance. In one embodiment, the systems and/or methods build a rendering file to render a current instance of an electronic form using the template and a view tree associated with the current instance.

11 Claims, 10 Drawing Sheets

U.S. PATENT DOCUMENTS

| | | |
|---|---|---|
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |

| | | | |
|---|---|---|---|
| 6,091,417 A | 7/2000 | Lefkowitz | |
| 6,094,657 A | 7/2000 | Hailpern et al. | |
| 6,097,382 A | 8/2000 | Rosen et al. | |
| 6,098,081 A | 8/2000 | Heidorn et al. | |
| 6,108,637 A | 8/2000 | Blumenau | |
| 6,108,783 A | 8/2000 | Krawczyk et al. | |
| 6,115,646 A | 9/2000 | Fiszman et al. | |
| 6,121,965 A | 9/2000 | Kenney et al. | |
| 6,122,647 A | 9/2000 | Horowitz | |
| 6,144,969 A | 11/2000 | Inokuchi et al. | |
| 6,151,624 A | 11/2000 | Teare et al. | |
| 6,154,128 A | 11/2000 | Wookey et al. | |
| 6,163,772 A | 12/2000 | Kramer et al. | |
| 6,167,521 A | 12/2000 | Smith et al. | |
| 6,167,523 A | 12/2000 | Strong | |
| 6,182,094 B1 | 1/2001 | Humpleman et al. | |
| 6,182,095 B1 | 1/2001 | Leymaster et al. | |
| 6,188,401 B1 | 2/2001 | Peyer | |
| 6,191,797 B1 | 2/2001 | Politis | |
| 6,192,367 B1 | 2/2001 | Hawley et al. | |
| 6,195,661 B1 | 2/2001 | Filepp et al. | |
| 6,199,204 B1 | 3/2001 | Donohue | |
| 6,209,128 B1 | 3/2001 | Gerard et al. | |
| 6,216,152 B1 | 4/2001 | Wong et al. | |
| 6,219,698 B1 | 4/2001 | Iannucci et al. | |
| 6,225,996 B1 | 5/2001 | Gibb et al. | |
| 6,235,027 B1 | 5/2001 | Herzon | |
| 6,253,366 B1 | 6/2001 | Mutschler, III | |
| 6,253,374 B1 | 6/2001 | Dresevic et al. | |
| 6,263,313 B1 | 7/2001 | Milsted et al. | |
| 6,266,810 B1 | 7/2001 | Tanaka et al. | |
| 6,268,852 B1 | 7/2001 | Lindhorst et al. | |
| 6,272,506 B1 | 8/2001 | Bell | |
| 6,275,227 B1 | 8/2001 | DeStefano | |
| 6,275,599 B1 | 8/2001 | Adler et al. | |
| 6,279,042 B1 | 8/2001 | Ouchi | |
| 6,281,896 B1 | 8/2001 | Alimpich et al. | |
| 6,282,711 B1 | 8/2001 | Halpern et al. | |
| 6,286,033 B1 | 9/2001 | Kishinsky et al. | |
| 6,292,897 B1 | 9/2001 | Gennaro et al. | |
| 6,297,819 B1 | 10/2001 | Furst | |
| 6,300,948 B1 | 10/2001 | Geller et al. | |
| 6,307,955 B1 | 10/2001 | Zank et al. | |
| 6,308,179 B1 | 10/2001 | Petersen et al. | |
| 6,308,273 B1 | 10/2001 | Goertzel et al. | |
| 6,311,271 B1 | 10/2001 | Gennaro et al. | |
| 6,314,415 B1 | 11/2001 | Mukherjee | |
| 6,321,259 B1 | 11/2001 | Ouellette et al. | |
| 6,321,334 B1 | 11/2001 | Jerger et al. | |
| 6,327,628 B1 | 12/2001 | Anuff et al. | |
| 6,331,864 B1 | 12/2001 | Coco et al. | |
| 6,342,907 B1 | 1/2002 | Petty et al. | |
| 6,343,149 B1 | 1/2002 | Motoiwa | |
| 6,343,302 B1 | 1/2002 | Graham | |
| 6,345,256 B1 | 2/2002 | Milsted et al. | |
| 6,345,278 B1 | 2/2002 | Hitchcock et al. | |
| 6,345,361 B1 | 2/2002 | Jerger et al. | |
| 6,347,323 B1 | 2/2002 | Garber et al. | |
| 6,349,408 B1 | 2/2002 | Smith | |
| 6,351,574 B1 | 2/2002 | Yair et al. | |
| 6,353,851 B1 | 3/2002 | Anupam et al. | |
| 6,353,926 B1 | 3/2002 | Parthesarathy et al. | |
| 6,356,906 B1 | 3/2002 | Lippert et al. | |
| 6,357,038 B1 | 3/2002 | Scouten | |
| 6,366,907 B1 | 4/2002 | Fanning et al. | |
| 6,366,912 B1 | 4/2002 | Wallent et al. | |
| 6,367,013 B1 | 4/2002 | Bisbee et al. | |
| 6,369,840 B1 | 4/2002 | Barnett et al. | |
| 6,369,841 B1 | 4/2002 | Salomon et al. | |
| 6,374,402 B1 | 4/2002 | Schmeidler et al. | |
| 6,381,742 B2 | 4/2002 | Forbes et al. | |
| 6,381,743 B1 | 4/2002 | Mutschler, III | |
| 6,389,434 B1 | 5/2002 | Rivette | |
| 6,393,456 B1 | 5/2002 | Ambler et al. | |
| 6,396,488 B1 | 5/2002 | Simmons et al. | |
| 6,405,221 B1 | 6/2002 | Levine et al. | |
| 6,405,238 B1 | 6/2002 | Votipka | |
| 6,408,311 B1 | 6/2002 | Baisley et al. | |
| 6,414,700 B1 | 7/2002 | Kurtenbach et al. | |
| 6,421,070 B1 | 7/2002 | Ramos et al. | |
| 6,421,656 B1 | 7/2002 | Cheng et al. | |
| 6,425,125 B1 | 7/2002 | Fries et al. | |
| 6,429,885 B1 | 8/2002 | Saib et al. | |
| 6,434,563 B1 | 8/2002 | Pasquali et al. | |
| 6,434,564 B2 | 8/2002 | Ebert | |
| 6,442,563 B1 | 8/2002 | Bacon et al. | |
| 6,442,755 B1 | 8/2002 | Lemmons et al. | |
| 6,446,110 B1 | 9/2002 | Lection et al. | |
| 6,449,617 B1 | 9/2002 | Quinn et al. | |
| 6,457,009 B1 | 9/2002 | Bollay | |
| 6,460,058 B2 | 10/2002 | Koppolu et al. | |
| 6,463,419 B1 | 10/2002 | Kluss | |
| 6,470,349 B1 | 10/2002 | Heninger | |
| 6,473,800 B1 | 10/2002 | Jerger et al. | |
| 6,476,828 B1 | 11/2002 | Burkett et al. | |
| 6,476,833 B1 | 11/2002 | Moshfeghi | |
| 6,477,544 B1 | 11/2002 | Bolosky | |
| 6,480,860 B1 | 11/2002 | Monday | |
| 6,487,566 B1 | 11/2002 | Sundaresan | |
| 6,490,601 B1 | 12/2002 | Markus et al. | |
| 6,493,702 B1 | 12/2002 | Adar et al. | |
| 6,501,864 B1 | 12/2002 | Eguchi et al. | |
| 6,502,101 B1 | 12/2002 | Verprauskus et al. | |
| 6,502,103 B1 | 12/2002 | Frey et al. | |
| 6,505,200 B1 | 1/2003 | Ims et al. | |
| 6,505,230 B1 | 1/2003 | Mohan et al. | |
| 6,505,300 B2 | 1/2003 | Chan et al. | |
| 6,507,856 B1 | 1/2003 | Chen et al. | |
| 6,516,322 B1 | 2/2003 | Meredith | |
| 6,519,617 B1 | 2/2003 | Wanderski et al. | |
| RE38,070 E | 4/2003 | Spies et al. | |
| 6,546,546 B1 | 4/2003 | Van Doorn | |
| 6,549,221 B1 | 4/2003 | Brown et al. | |
| 6,549,878 B1 | 4/2003 | Lowry et al. | |
| 6,549,922 B1 | 4/2003 | Srivastava et al. | |
| 6,553,402 B1 | 4/2003 | Makarios et al. | |
| 6,560,616 B1 | 5/2003 | Garber | |
| 6,560,620 B1 | 5/2003 | Ching | |
| 6,560,640 B2 | 5/2003 | Smethers | |
| 6,563,514 B1 | 5/2003 | Samar | |
| 6,571,253 B1 | 5/2003 | Thompson et al. | |
| 6,578,144 B1 | 6/2003 | Gennaro et al. | |
| 6,581,061 B2 | 6/2003 | Graham | |
| 6,584,469 B1 | 6/2003 | Chiang et al. | |
| 6,584,548 B1 | 6/2003 | Bourne et al. | |
| 6,585,778 B1 | 7/2003 | Hind et al. | |
| 6,589,290 B1 | 7/2003 | Maxwell et al. | |
| 6,594,686 B1 | 7/2003 | Edwards et al. | |
| 6,598,219 B1 | 7/2003 | Lau | |
| 6,603,489 B1 | 8/2003 | Edlund et al. | |
| 6,604,099 B1 | 8/2003 | Chung et al. | |
| 6,606,606 B2 | 8/2003 | Starr | |
| 6,609,200 B2 | 8/2003 | Anderson et al. | |
| 6,611,822 B1 | 8/2003 | Beams et al. | |
| 6,611,840 B1 | 8/2003 | Baer et al. | |
| 6,611,843 B1 | 8/2003 | Jacobs | |
| 6,613,098 B1 | 9/2003 | Sorge et al. | |
| 6,615,276 B1 | 9/2003 | Mastrianni et al. | |
| 6,629,109 B1 | 9/2003 | Koshisaka | |
| 6,631,357 B1 | 10/2003 | Perkowski | |
| 6,631,379 B2 | 10/2003 | Cox | |
| 6,631,497 B1 | 10/2003 | Jamshidi et al. | |
| 6,631,519 B1 | 10/2003 | Nicholson et al. | |
| 6,632,251 B1 | 10/2003 | Rutten et al. | |
| 6,635,089 B1 | 10/2003 | Burkett et al. | |
| 6,636,845 B2 | 10/2003 | Chau et al. | |

| Patent | Kind | Date | Inventor |
|---|---|---|---|
| 6,643,633 | B2 | 11/2003 | Chau et al. |
| 6,643,652 | B2 | 11/2003 | Helgeson et al. |
| 6,643,684 | B1 | 11/2003 | Malkin et al. |
| 6,651,217 | B1 | 11/2003 | Kennedy et al. |
| 6,654,737 | B1 | 11/2003 | Nunez |
| 6,654,932 | B1 | 11/2003 | Bahrs et al. |
| 6,658,417 | B1 | 12/2003 | Stakutis et al. |
| 6,658,622 | B1 | 12/2003 | Aiken et al. |
| 6,661,920 | B1 | 12/2003 | Skinner |
| 6,668,369 | B1 | 12/2003 | Krebs et al. |
| 6,671,805 | B1 | 12/2003 | Brown et al. |
| 6,675,202 | B1 | 1/2004 | Perttunen |
| 6,678,717 | B1 | 1/2004 | Schneider |
| 6,681,370 | B2 | 1/2004 | Gounares et al. |
| 6,691,230 | B1 | 2/2004 | Bardon |
| 6,691,281 | B1 | 2/2004 | Sorge et al. |
| 6,697,944 | B1 | 2/2004 | Jones et al. |
| 6,701,434 | B1 | 3/2004 | Rohatgi |
| 6,701,486 | B1 | 3/2004 | Weber et al. |
| 6,704,906 | B1 | 3/2004 | Yankovich et al. |
| 6,711,679 | B1 | 3/2004 | Guski et al. |
| 6,720,985 | B1 | 4/2004 | Silverbrook et al. |
| 6,725,426 | B1 | 4/2004 | Pavlov |
| 6,728,755 | B1 | 4/2004 | de Ment |
| 6,735,721 | B1 | 5/2004 | Morrow et al. |
| 6,745,367 | B1 | 6/2004 | Bates et al. |
| 6,748,385 | B1 | 6/2004 | Rodkin |
| 6,751,777 | B2 | 6/2004 | Bates |
| 6,754,874 | B1 | 6/2004 | Richman |
| 6,757,826 | B1 | 6/2004 | Paltenghe |
| 6,757,868 | B1 | 6/2004 | Glaser et al. |
| 6,760,723 | B2 | 7/2004 | Oshinsky et al. |
| 6,763,343 | B1 | 7/2004 | Brooke et al. |
| 6,772,139 | B1 | 8/2004 | Smith, III |
| 6,772,165 | B2 | 8/2004 | O'Carroll |
| 6,774,926 | B1 | 8/2004 | Ellis et al. |
| 6,779,154 | B1 | 8/2004 | Nussbaum et al. |
| 6,781,609 | B1 | 8/2004 | Barker et al. |
| 6,782,144 | B2 | 8/2004 | Bellavita et al. |
| 6,799,299 | B1 | 9/2004 | Li et al. |
| 6,801,929 | B1 | 10/2004 | Donoho et al. |
| 6,816,849 | B1 | 11/2004 | Halt, Jr. |
| 6,828,992 | B1 | 12/2004 | Freeman et al. |
| 6,845,380 | B2 | 1/2005 | Su et al. |
| 6,845,499 | B2 | 1/2005 | Srivastava et al. |
| 6,847,387 | B2 | 1/2005 | Roth |
| 6,848,078 | B1 | 1/2005 | Birsan et al. |
| 6,850,895 | B2 | 2/2005 | Brodersen et al. |
| 6,871,220 | B1 | 3/2005 | Rajan et al. |
| 6,874,130 | B1 | 3/2005 | Baweja et al. |
| 6,876,996 | B2 | 4/2005 | Czajkowski et al. |
| 6,889,359 | B1 | 5/2005 | Conner et al. |
| 6,901,403 | B1 | 5/2005 | Bata et al. |
| 6,915,454 | B1 | 7/2005 | Moore et al. |
| 6,931,532 | B1 | 8/2005 | Davis et al. |
| 6,941,510 | B1 | 9/2005 | Ozzie et al. |
| 6,941,511 | B1 | 9/2005 | Hind et al. |
| 6,941,521 | B2 | 9/2005 | Lin et al. |
| 6,948,129 | B1 | 9/2005 | Loghmani |
| 6,948,133 | B2 | 9/2005 | Haley |
| 6,948,135 | B1 | 9/2005 | Ruthfield et al. |
| 6,950,980 | B1 | 9/2005 | Malcolm |
| 6,961,897 | B1 | 11/2005 | Peel, Jr. et al. |
| 6,963,875 | B2 | 11/2005 | Moore et al. |
| 6,968,503 | B1 | 11/2005 | Chang et al. |
| 6,968,505 | B2 | 11/2005 | Stoll et al. |
| 6,993,714 | B2 | 1/2006 | Kaler et al. |
| 6,996,776 | B1 | 2/2006 | Makely et al. |
| 6,996,781 | B1 | 2/2006 | Myers et al. |
| 7,000,179 | B2 | 2/2006 | Yankovich et al. |
| 7,002,560 | B2 | 2/2006 | Graham |
| 7,003,722 | B2 | 2/2006 | Rothchiller et al. |
| 7,010,580 | B1 | 3/2006 | Fu et al. |
| 7,020,869 | B2 | 3/2006 | Abriari et al. |
| 7,024,417 | B1 | 4/2006 | Russakovsky et al. |
| 7,032,170 | B2 | 4/2006 | Poulose |
| 7,036,072 | B1 | 4/2006 | Sulistio et al. |
| 7,039,875 | B2 | 5/2006 | Khalfay et al. |
| 7,043,687 | B2 | 5/2006 | Knauss et al. |
| 7,051,273 | B1 | 5/2006 | Holt et al. |
| 7,058,663 | B2 | 6/2006 | Johnston et al. |
| 7,062,764 | B2 | 6/2006 | Cohen et al. |
| 7,065,493 | B1 | 6/2006 | Homsi |
| 7,076,728 | B2 | 7/2006 | Davis et al. |
| 7,080,083 | B2 | 7/2006 | Kim et al. |
| 7,080,325 | B2 | 7/2006 | Treibach-Heck et al. |
| 7,086,009 | B2 | 8/2006 | Resnick et al. |
| 7,086,042 | B2 | 8/2006 | Abe et al. |
| 7,088,374 | B2 | 8/2006 | David et al. |
| 7,100,147 | B2 | 8/2006 | Miller et al. |
| 7,103,611 | B2 | 9/2006 | Murthy et al. |
| 7,106,888 | B1 | 9/2006 | Silverbrook et al. |
| 7,107,282 | B1 | 9/2006 | Yalmanchi |
| 7,107,521 | B2 | 9/2006 | Santos |
| 7,120,863 | B1 | 10/2006 | Wang |
| 7,130,885 | B2 | 10/2006 | Chandra et al. |
| 7,143,341 | B1 | 11/2006 | Kohli |
| 7,146,564 | B2 | 12/2006 | Kim et al. |
| 7,152,205 | B2 | 12/2006 | Day et al. |
| 7,168,035 | B1 | 1/2007 | Bell et al. |
| 7,178,166 | B1 | 2/2007 | Taylor et al. |
| 7,190,376 | B1 | 3/2007 | Tonisson |
| 7,191,394 | B1 | 3/2007 | Ardeleanu et al. |
| 7,200,816 | B2 | 4/2007 | Falk et al. |
| 7,213,200 | B2 | 5/2007 | Abe et al. |
| 7,236,982 | B2 | 6/2007 | Zlatanov et al. |
| 7,249,328 | B1 | 7/2007 | Davis |
| 7,281,018 | B1 | 10/2007 | Begun et al. |
| 7,284,208 | B2 | 10/2007 | Matthews |
| 7,287,218 | B1 | 10/2007 | Knotz et al. |
| 7,296,017 | B2 | 11/2007 | Larcheveque et al. |
| 7,313,758 | B2 | 12/2007 | Kozlov |
| 7,316,003 | B1 | 1/2008 | Dulepet et al. |
| 7,318,237 | B2 | 1/2008 | Moriconi et al. |
| 7,337,391 | B2 | 2/2008 | Clarke et al. |
| 7,337,392 | B2 | 2/2008 | Lue |
| 7,346,610 | B2 | 3/2008 | Ruthfield et al. |
| 7,346,840 | B1 | 3/2008 | Ravishankar et al. |
| 7,346,848 | B1 | 3/2008 | Ruthfield et al. |
| 7,350,141 | B2 | 3/2008 | Kotler et al. |
| 7,373,595 | B2 | 5/2008 | Jones et al. |
| 7,412,649 | B2 | 8/2008 | Emek et al. |
| 7,424,671 | B2 | 9/2008 | Elza et al. |
| 7,428,699 | B1 | 9/2008 | Kane et al. |
| 2001/0007109 | A1 | 7/2001 | Lange |
| 2001/0022592 | A1 | 9/2001 | Alimpich et al. |
| 2001/0024195 | A1 | 9/2001 | Hayakawa |
| 2001/0037345 | A1 | 11/2001 | Kiernan |
| 2001/0054004 | A1 | 12/2001 | Powers |
| 2001/0056429 | A1 | 12/2001 | Moore |
| 2001/0056460 | A1 | 12/2001 | Sahota et al. |
| 2002/0010700 | A1 | 1/2002 | Wotring |
| 2002/0010743 | A1 | 1/2002 | Ryan et al. |
| 2002/0010746 | A1 | 1/2002 | Jilk et al. |
| 2002/0010855 | A1 | 1/2002 | Reshef et al. |
| 2002/0013788 | A1 | 1/2002 | Pennell et al. |
| 2002/0019941 | A1 | 2/2002 | Chan et al. |
| 2002/0023113 | A1 | 2/2002 | Hsing et al. |
| 2002/0026441 | A1 | 2/2002 | Kutay et al. |
| 2002/0026461 | A1 | 2/2002 | Kutay et al. |
| 2002/0032590 | A1 | 3/2002 | Anand et al. |
| 2002/0032692 | A1 | 3/2002 | Suzuki et al. |
| 2002/0032706 | A1 | 3/2002 | Perla et al. |
| 2002/0032768 | A1 | 3/2002 | Voskuil |
| 2002/0035579 | A1 | 3/2002 | Wang et al. |
| 2002/0035581 | A1 | 3/2002 | Reynar et al. |

| | | | | | |
|---|---|---|---|---|---|
| 2002/0040469 A1 | 4/2002 | Pramberger | 2003/0189593 A1 | 10/2003 | Yarvin |
| 2002/0054126 A1 | 5/2002 | Gamon | 2003/0192008 A1 | 10/2003 | Lee |
| 2002/0057297 A1 | 5/2002 | Grimes et al. | 2003/0200506 A1 | 10/2003 | Abe et al. |
| 2002/0065798 A1 | 5/2002 | Bostleman et al. | 2003/0204511 A1 | 10/2003 | Brundage et al. |
| 2002/0065847 A1 | 5/2002 | Furukawa et al. | 2003/0204814 A1 | 10/2003 | Elo et al. |
| 2002/0070973 A1 | 6/2002 | Croley | 2003/0205615 A1 | 11/2003 | Marappan |
| 2002/0078074 A1 | 6/2002 | Cho et al. | 2003/0212664 A1 | 11/2003 | Breining et al. |
| 2002/0078103 A1 | 6/2002 | Gorman et al. | 2003/0212902 A1 | 11/2003 | van der Made |
| 2002/0083318 A1 | 6/2002 | Larose | 2003/0217053 A1 | 11/2003 | Bachman et al. |
| 2002/0099952 A1 | 7/2002 | Lambert et al. | 2003/0220930 A1 | 11/2003 | Milleker et al. |
| 2002/0100027 A1 | 7/2002 | Binding et al. | 2003/0225469 A1 | 12/2003 | DeRemer et al. |
| 2002/0112224 A1 | 8/2002 | Cox | 2003/0225768 A1 | 12/2003 | Chaudhuri et al. |
| 2002/0129056 A1 | 9/2002 | Conant | 2003/0225829 A1 | 12/2003 | Pena et al. |
| 2002/0133484 A1 | 9/2002 | Chau et al. | 2003/0226132 A1 | 12/2003 | Tondreau et al. |
| 2002/0152222 A1 | 10/2002 | Holbrook | 2003/0233374 A1 | 12/2003 | Spinola et al. |
| 2002/0152244 A1 | 10/2002 | Dean et al. | 2003/0233644 A1 | 12/2003 | Cohen et al. |
| 2002/0156772 A1 | 10/2002 | Chau et al. | 2003/0236859 A1 | 12/2003 | Vaschillo et al. |
| 2002/0156846 A1 | 10/2002 | Rawat et al. | 2003/0236903 A1 | 12/2003 | Piotrowski |
| 2002/0156929 A1 | 10/2002 | Hekmatpour | 2003/0237046 A1 | 12/2003 | Parker et al. |
| 2002/0169752 A1 | 11/2002 | Kusama et al. | 2003/0237047 A1 | 12/2003 | Borson |
| 2002/0169789 A1 | 11/2002 | Kutay et al. | 2004/0002939 A1 | 1/2004 | Arora et al. |
| 2002/0174147 A1 | 11/2002 | Wang et al. | 2004/0002950 A1 | 1/2004 | Brennan et al. |
| 2002/0174417 A1 | 11/2002 | Sijacic et al. | 2004/0003031 A1 | 1/2004 | Brown et al. |
| 2002/0178380 A1 | 11/2002 | Wolf et al. | 2004/0003353 A1 | 1/2004 | Rivera et al. |
| 2002/0184219 A1 | 12/2002 | Preisig et al. | 2004/0003389 A1 | 1/2004 | Reynar et al. |
| 2002/0188597 A1 | 12/2002 | Kern et al. | 2004/0010752 A1 | 1/2004 | Chan et al. |
| 2002/0188613 A1 | 12/2002 | Chakraborty et al. | 2004/0024842 A1 | 2/2004 | Witt |
| 2002/0194219 A1 | 12/2002 | Bradley et al. | 2004/0030991 A1 | 2/2004 | Hepworth et al. |
| 2002/0196281 A1 | 12/2002 | Audleman et al. | 2004/0039990 A1 | 2/2004 | Bakar et al. |
| 2002/0196288 A1 | 12/2002 | Emrani | 2004/0039993 A1 | 2/2004 | Kougiouris et al. |
| 2002/0198891 A1 | 12/2002 | Li et al. | 2004/0044961 A1 | 3/2004 | Pesenson |
| 2002/0198935 A1 | 12/2002 | Crandall, Sr. et al. | 2004/0044965 A1 | 3/2004 | Toyama et al. |
| 2003/0004951 A1 | 1/2003 | Chokshi | 2004/0054966 A1 | 3/2004 | Busch et al. |
| 2003/0007000 A1 | 1/2003 | Carlson et al. | 2004/0059754 A1 | 3/2004 | Barghout et al. |
| 2003/0014397 A1 | 1/2003 | Chau et al. | 2004/0073565 A1 | 4/2004 | Kaufman et al. |
| 2003/0018668 A1 | 1/2003 | Britton et al. | 2004/0073868 A1 | 4/2004 | Easter et al. |
| 2003/0020746 A1 | 1/2003 | Chen et al. | 2004/0078756 A1 | 4/2004 | Napper et al. |
| 2003/0023641 A1 | 1/2003 | Gorman et al. | 2004/0083426 A1 | 4/2004 | Sahu |
| 2003/0025732 A1 | 2/2003 | Prichard | 2004/0088647 A1 | 5/2004 | Miller et al. |
| 2003/0026507 A1 | 2/2003 | Zlotnick | 2004/0088652 A1 | 5/2004 | Abe et al. |
| 2003/0028550 A1 | 2/2003 | Lee et al. | 2004/0093596 A1 | 5/2004 | Koyano |
| 2003/0037303 A1 | 2/2003 | Bodlaender et al. | 2004/0107367 A1 | 6/2004 | Kisters |
| 2003/0043986 A1 | 3/2003 | Creamer et al. | 2004/0117769 A1 | 6/2004 | Lauzon et al. |
| 2003/0046665 A1 | 3/2003 | Ilin | 2004/0123277 A1 | 6/2004 | Schrader et al. |
| 2003/0048301 A1 | 3/2003 | Menninger | 2004/0146199 A1 | 7/2004 | Berkner et al. |
| 2003/0051243 A1 | 3/2003 | Lemmons et al. | 2004/0148178 A1 | 7/2004 | Brain |
| 2003/0055811 A1 | 3/2003 | Stork et al. | 2004/0163041 A1 | 8/2004 | Engel |
| 2003/0055828 A1 | 3/2003 | Koch et al. | 2004/0172442 A1 | 9/2004 | Ripley |
| 2003/0056198 A1 | 3/2003 | Al-Azzawe et al. | 2004/0181711 A1 | 9/2004 | Johnson et al. |
| 2003/0061386 A1 | 3/2003 | Brown et al. | 2004/0186762 A1 | 9/2004 | Beaven et al. |
| 2003/0061567 A1 | 3/2003 | Brown et al. | 2004/0189708 A1 | 9/2004 | Larcheveque et al. |
| 2003/0084424 A1 | 5/2003 | Reddy et al. | 2004/0189716 A1 | 9/2004 | Paoli et al. |
| 2003/0093755 A1 | 5/2003 | O'Carroll | 2004/0194035 A1 | 9/2004 | Chakraborty |
| 2003/0110443 A1 | 6/2003 | Yankovich et al. | 2004/0205473 A1 | 10/2004 | Fisher et al. |
| 2003/0120578 A1 | 6/2003 | Newman | 2004/0205525 A1 | 10/2004 | Murren et al. |
| 2003/0120651 A1 | 6/2003 | Bernstein et al. | 2004/0205534 A1 | 10/2004 | Koelle |
| 2003/0120659 A1 | 6/2003 | Sridhar | 2004/0205571 A1 | 10/2004 | Adler et al. |
| 2003/0120671 A1 | 6/2003 | Kim et al. | 2004/0205592 A1 | 10/2004 | Huang |
| 2003/0120686 A1 | 6/2003 | Kim et al. | 2004/0205605 A1 | 10/2004 | Adler et al. |
| 2003/0126555 A1 | 7/2003 | Aggarwal et al. | 2004/0205653 A1 | 10/2004 | Hadfield et al. |
| 2003/0128196 A1 | 7/2003 | Lapstun et al. | 2004/0205671 A1 | 10/2004 | Sukehiro et al. |
| 2003/0135825 A1 | 7/2003 | Gertner et al. | 2004/0210599 A1 | 10/2004 | Friedman et al. |
| 2003/0140132 A1 | 7/2003 | Champagne et al. | 2004/0210645 A1 | 10/2004 | Kouznetsov et al. |
| 2003/0142072 A1 | 7/2003 | Lapstun et al. | 2004/0221238 A1 | 11/2004 | Cifra et al. |
| 2003/0149934 A1 | 8/2003 | Worden | 2004/0221245 A1 | 11/2004 | Chickles et al. |
| 2003/0158897 A1 | 8/2003 | Ben-Natan et al. | 2004/0237030 A1 | 11/2004 | Malkin |
| 2003/0163285 A1 | 8/2003 | Nakamura et al. | 2004/0260593 A1 | 12/2004 | Abraham-Fuchs et al. |
| 2003/0167277 A1 | 9/2003 | Hejlsberg et al. | 2004/0261019 A1 | 12/2004 | Imamura et al. |
| 2003/0182268 A1 | 9/2003 | Lal | 2004/0268229 A1 | 12/2004 | Paoli et al. |
| 2003/0182327 A1 | 9/2003 | Ramanujam et al. | 2005/0004893 A1 | 1/2005 | Sangroniz |
| 2003/0187756 A1 | 10/2003 | Klivington et al. | 2005/0005248 A1 | 1/2005 | Rockey et al. |
| 2003/0187930 A1 | 10/2003 | Ghaffar et al. | 2005/0015279 A1 | 1/2005 | Rucker |
| 2003/0188260 A1 | 10/2003 | Jensen et al. | 2005/0015732 A1 | 1/2005 | Vedula et al. |

| | | |
|---|---|---|
| 2005/0022115 A1 | 1/2005 | Baumgartner et al. |
| 2005/0027757 A1 | 2/2005 | Kiessig et al. |
| 2005/0028073 A1 | 2/2005 | Henry et al. |
| 2005/0033728 A1 | 2/2005 | James |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0160398 A1 | 7/2005 | Bjornson et al. |
| 2005/0171746 A1 | 8/2005 | Thalhammer-Reyero |
| 2005/0198086 A1 | 9/2005 | Moore et al. |
| 2005/0198125 A1 | 9/2005 | Beck et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0246304 A1 | 11/2005 | Knight et al. |
| 2005/0262112 A1 | 11/2005 | Moore |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0129583 A1 | 6/2006 | Catorcini et al. |
| 2006/0129978 A1 | 6/2006 | Abriani et al. |
| 2006/0143220 A1 | 6/2006 | Spencer, Jr. |
| 2006/0161559 A1 | 7/2006 | Bordawekar et al. |
| 2006/0173865 A1 | 8/2006 | Fong |
| 2006/0200754 A1 | 9/2006 | Kablesh et al. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0094589 A1 | 4/2007 | Paoli |
| 2007/0100877 A1 | 5/2007 | Paoli |
| 2007/0101280 A1 | 5/2007 | Paoli |
| 2007/0118803 A1 | 5/2007 | Walker et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2008/0028340 A1 | 1/2008 | Davis |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 A | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 3191429 | 1/2000 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO0157720 | 11/2000 |
| WO | WO 01/44934 | 6/2001 |

OTHER PUBLICATIONS

Altova, "Altova Tools for XPath 1.0/2.0", Altova,1-12.
"Microsoft Word 2000 Screenshots", Word,(2000),1-17.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).
"Microsoft Word 2000 Screenshots", (2000)11-17.
XmlSpy, "XmlSpy 2004 Enterprise Edition Manual", Altova,(May 17, 2004),1-25, 220-225.
StylusStudio, "StylusStudio: XPath Tools", 2004-2007, StylusStudio,1-14.
Dodds, "Toward an XPath API", xml.com,(May 7, 2001),1-3.
Bradley, Neil "The XML Companion, Third Edition", *Published by Addison Wesley Professional*, http://proquest.safaribooksonline.com0201770598, http,(Dec. 12, 2001),1-18.
Klarlund, Nils "DSD: A Schema Language for XML", *ACM, FSMP* Portland Oregon, (2000),101-111.
Watt, Andrew "MIcrosoft Office Infopath 2003 Kick Start", *(Published by Sams) Print ISBN-10:0-672-32623-X*, (Mar. 24, 2004),1-57.
Hu, et al., "A Programmable Editor for Developing Structured Documents based on Bidirectional Transformations", ACM,(Aug. 2004),178-179.
Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.
Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.
Laura Acklen & Read Gilgen, "Using Corel Wordperfect 9", 251-284, 424-434, 583-586 (1998).
"A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.
"Architecture for a Dynamic Information Area Control" IBM Technical Disclosure Bulletin IBM Corp. New York US vol. 37 No. 10 Jan. 10, 1994. pp. 245-246.
"Netscape Communicator's Collapsible Toolbars" CHI'98 Human Factors in Computing Systems Conference Proceedings Los Angeles CA Apr. 18-23, 1998 pp. 81-86.
Barker et al., "Creating In-Line Objects Within An Integrated Editing Environment," IBM Technical Disclosure Bulletin, vol. 27, No. 5, Oct. 1984, p. 2962.

"Flexible Information Presentation with XML" 1998 The Institution of Electrical Engineers 6 pages.

Berg A., "Naming and Binding: Monikers" Inside OLE, 1995, Chapter 9, pp. 431-490.

"Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.

"XKvalidator: A Constraint Validator for XML" CIKM '-2 Nov. 4-9, 2002 Copyright 2002 ACM 1-58113-492-4/02/011 pp. 446-452.

"Designing Valid XML Views" ER 2002 LNCS 2503 2002 Springer-Verlag Berlin Heidelberg 2002 pp. 463-477.

Efficient Management of Multiversion Documents by Object Referencing Proceedings of the 27th VLDB Conference 2001 pp. 291-300.

"Efficient schemes for managing mulitversion XML documents" VLDB Journal (2002) pp. 332-352.

"Storing and Querying Multiversion XML Documents using Durable Node Numbers" IEEE 2002 pp. 232-241.

"XML Document Versioning" SIGMOD Record vol. 30 No. 3 Sep. 2001 pp. 46-53.

"Generic Validation of Structural Content with Parametric Modules" ICFP '01 Sep. 3-5, 2001 Copyright 2001 ACM 1-58113-415-0/01/0009 pp. 98-109.

"Managing Complex Documents Over the WWW: A Case Study for XML" IEEE Transactions on Knowledge and Data Engineering vol. 11 No. 4 Jul./Aug. 1999. pp. 629-938.

Clapp D., "The NeXT Application Kit Part I: Non-Responsive Classes," The NeXT Bible 1990, Chapter 16, pp. 275-293.

Clark James—W3C Editor; "XSL Transformation (XSLT) Version 1.0" Nov. 16, 1999 W3C (MIT INRIA Kejo) pp. 1-156.

W3C Editor James Clark and Ste; "XML Path Language (XPath) Version 1.0" Nov. 16, 1999 W3C (MIT INRIA Kejo) pp. 1-49.

"From Small Beginnings" Knowledge Management Nov. 2001 pp. 28-30.

"XML Editors: Allegations of Functionality in search of reality" Internet 'Online! 1999 XP002230082 retrieved from the Internet <URL:http://www.ivritype.com/xml/>.

"Photo Shop 5/5.5.WOW! Book" 2000 Peachpit Press pp. 8-17.

Description of Whitehill Composer software product producted by Whitehill Technologies Inc. available at <http://www.xml.com/pub/p/221> accessed on Apr. 8, 2004, two pages.

DiLascia et al., "Sweeper" Microsoft Interactive Developer, vol. 1, No. 1, 1996, 27 pages.

"XML Spy Tops as XML Editor" http://www.eweek.com/article2/0395972404100.asp Nov. 25, 2002 4 pages.

"Agent-based Software Configuration and Deployment" Thesis of the University of Colorado Online Dec. 31, 1999 retrieved from the Internet on Nov. 7, 2003: <http://www.cs.colorado.edu/users/rickhall/documents/ThesisFinal.pdf> 169 pages.

"Mapping and Displaying Structural Transformations between XML and PDF" DocEng '02 Nov. 8-9, 2002 Copyright 2002 ACM 1-58113-597-7/02/0011 pp. 95-102.

"Tsbiff—tildeslash biff—version 1.2.1" Internet Document [Online] Jun. 1999 URL: http://web.archive.org/web/19990912001527/http://www.tildeslash.com/tsbiff/.

Herzner et al., "CDAM- Compound Document Access and Management. An Object-Oriented Approach" Multimedia Systems Interaction and Applications, 1992, Chapter 3, pp. 17-36.

"Micro-Firewalls for Dynamic Network Security with Distributed Intrusion Detection"; IEEE INternational Symposium on Network Computing and Applications; 2001; pp. 68-79.

"Specifying Runtime Environments and Functionalities of Downloadable Components Under the Sandbox Mode"; International Symposium on Principles of Software Evolution; 2000; pp. 138-142.

"An Efficiently Updatable Index Scheme for Structured Documents" 1998 IEEE pp. 991-996.

"Immediate and Partial Validation Mechanism for the Conflict Resolution of Update Operations in XML Databases" WAIM 2002 LNCS 2419 2002 pp. 387-396 Springer-Veriag Berlin Heidelberg 2002.

Kobayashi et al., "An Update on BTRON-specification OS Development" IEEE 1991, pp. 132-140.

Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.

McCright J.S.; "New Tool Kit to Link Groove with Microsoft Sharepoint" eWeek Enterprise News & Reviews Ziff Davis Media Inc. Jul. 29, 2002.

Musgrave S; "Networking technology—impact and opportunities" Survey and Statistical Computing 1996. Proceedings of the Second ASC International Conference. Sep. 1996. pp. 369-378. London UK.

"Validation with MSXML and XML Schema" Windows Developer Magazine Jan. 2002 pp. 35-38.

"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

"Netscape Communicator 4.61 for OS/2 Warp" Software 1999 The whole software release & "Netscape—Version 4.6 [en]-010615" Netscape Screenhot Oct. 2, 2002.

"A secure conditional access system using digital signature and encryption" 2003 Digest of Technical Papers. International Conference on Consumer Electronics Jun. 2003 pp. 220-221.

Object Management Group, XML Metadata Interchange (XMI) Specification Version 1.2 Jan. 2002.

"Delphi 5 Developer's Guide" Sams Publishing 1999 Chapter 31 Section: Data Streaming 6 pages.

Peterson B. , "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Prevelakis et al., "Sandboxing Applications"; Proceedings of the FREENIX Track; 2001; pp. 119-126.

Rapaport L; "Get more from SharePoint" Transform Magazine vol. 11 No. 3.

"Validating MPEG-21 Encapsulated Functional Metadata" IEEE 2002 pp. 209-212.

Schmid et al., "ProtectingData from Malicious Software"; 18th Annual Computer Security Applications Conference; 2002; pp. 199-208.

Staneck W., "Internal and External Media" Electronic Publishing Unleashed, 1995, Chapter 22, pp. 510-542.

"Store and Organize Related Project Files in a Binder," Getting Results with Microsoft Office, 1990, pp. 109-112.

Sun Q. et al., "A robust and secure media signature scheme for JPEG images" Proceedings of 2002 IEEE Workshop on Multimedia Signal Processing, Dec. 2002, pp. 296-299.

"XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].

"An Efficient and Flexible Access Control Framework for Java Programs in Mobile Terminals"; 22nd International Conference on Distributed Computing Systems Workshops; 2002; pp. 777-782.

Trupin J., "The Visual Programmer," Microsoft Systems Journal, Apr. 1996, pp. 103-105.

"XML: Not a Silver Bullet But a Great Pipe Wrench" Standardview vol. 6. No. 3 Sep. 1998 pp. 125-132.

"The Open Software Description Format" Online Aug. 13, 1997 retrieved from the Internet on Nov. 7, 2003: <http://www.w3.org/TR/NOTE-OSD> 11 pages.

"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

"The Component Object Model" A Technical Overview Oct. 1994 Microsoft Corp. pp. 1-14.

"Managing and Querying Multi-Version XML Data with Update Logging" DocEng '02 Nov. 8-9, 2002 Copyright 2002 ACM 1-58113-594-7/02/0011 pp. 74-81.

Zdonik S., "Object Management System Concepts," ACM, 1984, pp. 13-19.

Leblond et al, "PC Magazine Guide to Quattro Pro for Windows", pp. 9-11, 42-61, Ziff-Davis Press, Copyright 1993 by the LeBlond Group.

Microsoft Visual Basic 5.0 Programmer's Guide 1997; pp. 578-579;Redmond WA 98052-6399.

Excel 97 for Busy People Published by Osborne/Mcgraw-Hill 1997 pp. 48-50.

Pacheco, Xavier et al., "Delphi 5 Developer's Guide", Sams Publishing. Chapter 31, Section: Data Streaming,(1999),4.

Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Dubinko, Micah "XForms and Microsoft InfoPath", Retrieved from the Internet at http://www.xml.com/lpt/a/1311 on Jan. 21, 2007,(Oct. 29, 2003).

Udell, Jon "InfoPath and XForms", Retrieved from the Internet at http://weblog.infoworld.com/udell/2003/02/26.html,(Feb. 26, 2003).

Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Singh, Darshan "Microsoft InfoPath 2003 By Example", Retrieved from the Internet at http://www.perfectxml.com/InfoPath.asp on Jan. 21, 2007,(Apr. 20, 2003).

Raman, T. V., et al., "XForms 1.0", (Dec. 2001),Section 1-12.2.3 & Appendices A-G.

"Enter Key", Retrieved from the Internet at http://systems.webopedia.com/TERM/Enter_key.html on Dec. 20, 2006.

Lehtonen, Miro et al., "A Dynamic User Interface for Document Assembly", Department of Computer Science, University of Helsinki,(Nov. 2002).

Rees, Michael J., "Evolving the Browser Towards a Standard User Interface Architecture", School of Information Technology, Bond University, Australia,(2001).

"Microsoft Visual Basic 5.0 Programmer's Guide", *Microsoft Press*, (1997),pp. 42-43, 54-58.

Nelson, Joe "Client-side Form Validation Using JavaScript", *Developer Advisory*, (Sep. 21, 2001).

Brabrand, et al., "Power Forms Declarative Client-side Form Field Validation", (2002),1-20.

Anat, Eyal et al., "Integrating and Customizing Hererogeneous E-Commerce Applications", The VLDB Journal-The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,(May 2002),25 pages.

Borland, Russo "Running Microsoft Word 97", 314-315, 338, 361-362, 390, and 714-719.

"Microsoft Word 2000", Screenshots,(1999),1-5.

Microsoft Corporation, "Microsoft Computer Dictionary" Microsoft Press, Fifth Edition, p. 149.

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

Atova, "User Reference manual Version 4.4, XML Spy suite 4.4," Atova Ges.m.b.H and Altova, Inc., May 24, 2002, pages cover, copyright page, 1-565.

Altova, Inc., "XML Spy 4.0 Manual," Altova Inc. & Altova GmbH, copyright 1998-2001, Chapters 1, 2, and 6, encompassing pp. 1-17, 18-90, and 343-362.

Altova et al. XML Spy, XML integrated Development Environments, Altova Inc., 2002, pp. 1-18.

Ben-Natan, Provisional U.S. Appl. No. 60/203,081, filed May 9, 2000, entitled "Internet platform for creating and supporting communities".

Cybook, Inc.: "Copying the Search Form to Services-based Web Sites" INternet Article, (online) Jul. 26, 2004.*the whole document*.

Excel Developer Tip (hereinafter "Excel"), "Determining the Data Type of a Cell", May 13, 1998, p. 1 (available at http://jwalk.com/ss//excel/tips/tip62.htm).

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Ixia Soft, "Steamlining content creation, retrieval, and publishing on the Web using TEXTML Server and SML Spy 4 Suite in an Integrated, Web publishing environment," (Partner's Whitepaper, published on the Web as of Jun. 6, 2002, downlowad pp. 1-16.

Kutay, Provisional U.S. Appl. No. 60/209,713, filed Jun. 5, 2000, entitled, "Methods and systems for accessing, organizing presenting and viewing data".

Macromedia, Inc.: "Dreamweaver Technote, Changes in copying and pasting in Dreamweaver 4" Internet Article (online). *the whole document*.

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, Provisional U.S. Appl. No. 60/191,662, filed Mar. 23, 2000, entitled "Collection-based presistent digital archives".

Rado, Dave: "How to create a template that makes it easy for users to "fill in the blanks", without doing any programming" Microsoft Word MVP FAQ Site, (online) Apr. 30, 2004, the whole document.

* cited by examiner

| | | |
|---|---|---|
| Root node indicator | 402a | |
| Merchant name indicator | 402b | |
| Form name indicator | 402c | |
| Name field indicator | 402d | Benjamin T. Jorgens |
| Phone field indicator | 402e | 206-555-1212 |
| Repeating Product node indicator | 402f | 2 |
| Product 1 indicator | 402g | |
| Item Id. 1 indicator | 402h | 13492 |
| Quantity 1 indicator | 402i | 2 |
| Unit Price 1 indicator | 402j | 13.56 |
| Total 1 indicator | 402k | 27.12 |
| Product 2 indicator | 702g | |
| Item Id. 2 indicator | 702h | Blank |
| Quantity 2 indicator | 702i | 0 |
| Unit Price 2 indicator | 702j | 0 |
| Total 2 indicator | 702k | 0 |
| Grand total indicator | 402l | 27.12 |

Network Form

602 → Merchant
*Seller of Quality Products for Twelve Years*

606 → PURCHASE ORDER 606, 610
Name: Benjamin T. Jorgens
Phone: 206-555-1212
612, 608

| Item Id. | Quantity | Unit Price | Total |
|---|---|---|---|
| 13692 | 2 | 13.56 | 27.12 |
| 0 | 0 | 0 | 0 |

620-2, 622-2, 626-2, 626-2
620-1, 622-1, 626-1, 626-1

| Grand Total | 27.12 |
|---|---|

TEMPLATE FOR RENDERING AN ELECTRONIC FORM

BACKGROUND

Electronic forms are commonly used to collect information. One way in which to enable use of electronic forms is over a communication network, such as a local intranet or the Internet. A user may use an electronic form, for instance, through his or her network browser. The user's network browser may contact a network computer that is capable of enabling the browser to display and allow editing of the electronic form.

To enable the browser to display and allow editing of the network-enabled electronic form (a "network form"), a network computer may build a control tree when the form is first requested and in response to subsequent requests. To enable a user to interact with a form from start to finish, the network computer may receive and respond to dozens of requests. This may require the network computer to build dozens of control trees. Building numerous control trees, however, can require considerable processing and memory resources.

The network computer also traverses each control tree to provide the browser with view information (e.g., HyperText Markup Language—HTML). The network computer sends this view information to a user's browser over the network, which may require considerable time and network bandwidth. The time needed to send this information may also adversely affect a user's editing experience with the form, such as by causing the user to have to wait for his browser to receive the information before continuing to edit the form.

These problems with network forms are exacerbated when a network computer receives many requests related to the form, such as from many people using the same form. For each request, the network computer may need to build a control tree, traverse the control tree for viewing information, and send the view information to the user's network browser that made the request. This expends the network computer's resources, the communication network's bandwidth, and potentially slows each user's editing experience.

SUMMARY

System(s) and/or method(s) ("tools") are described that enable rendering of electronic forms using a template. This template may comprise pieces of rendering data that do not depend on a state or instance of an electronic form. This independence permits the template to enable rendering of many instances of an electronic form.

In some cases the template has a representation of an electronic form mapped to the pieces of rendering data. This representation may enable the pieces of rendering data to be associated with a particular instance through a view tree. This view tree is based on a particular instance of a form and may have a structure similar to that of the representation.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

FIG. 7 illustrates an exemplary altered view tree showing a user's interaction with a network form.

FIG. 9 shows a network form based on an altered data instance.

The same numbers are used throughout the disclosure and figures to reference like components and features.

DETAILED DESCRIPTION

Overview

The following disclosure describes one or more tools enabling an electronic form to be rendered using a template. This template may be built and used by a local or network computer.

The template may be independent of an electronic form's current state or instance. The current instance may instead be reflected in a view tree. This view tree is used in conjunction with the template to build a rendering file by which the current instance may be rendered.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
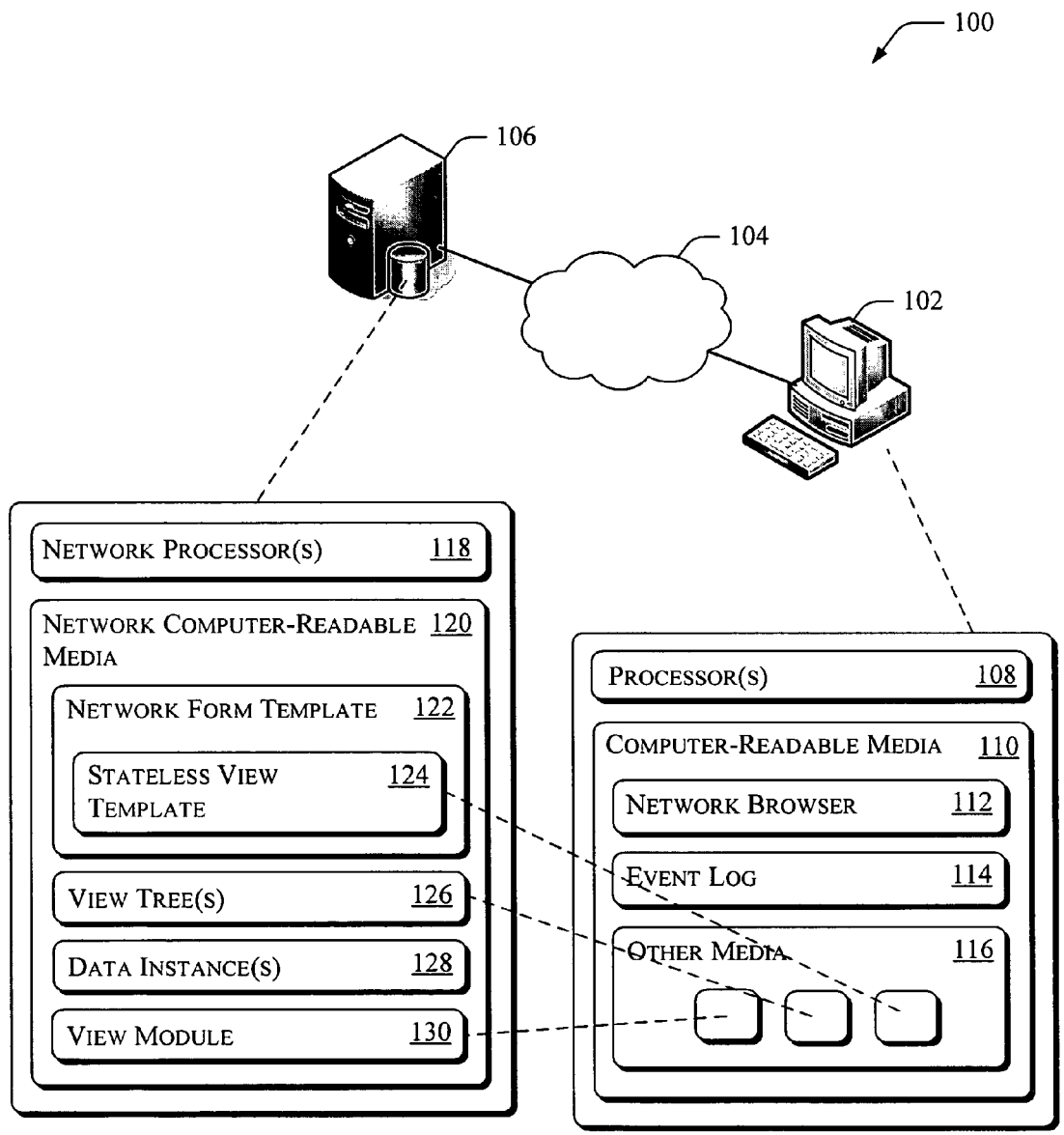
FIG. 1 illustrates an exemplary operating environment in which various embodiments can operate.

FIG. 1 illustrates one such operating environment generally at 100 comprising a computer 102, a communication network 104, and a network computer 106. The computer is shown comprising one or more processor(s) 108 and computer-readable media 110. The processor(s) are capable of executing the computer-readable media. The computer-readable media comprises a network browser 112, an event log 114, and other media 116. The dashed lines connected to the other media show that they may be downloaded by the computer from the network computer.

The communication network enables communication between the computer and the network computer and may comprise one or more of an intranet, like a company's internal network, the Internet, and the like.

Network computer 106 is shown comprising one or more network processor(s) 118 and network computer-readable media 120. The network processor(s) are capable of executing the network computer-readable media. This computer-readable media comprises a network form template 122 having a stateless view template 124. This media also comprises (or will later comprise) one or more view trees 126 and data instances 128, and also comprises a view module 130. Each view tree can be built to reflect renderable portions of each data instance. Each data instance comprises the data of a particular instance of the form. The data instances have hierarchical tree structures comprising a markup language, like eXtensible Markup Language (XML). View module 130 is capable of enabling a network or local computer (e.g., computer 102) to render a data instance of an electronic form using a view tree for that data instance and a stateless view template.

Network form template 122 enables data instances of an electronic form to be built, displayed, and edited. This template may comprise or be associated with script, rules determined by a schema governing the network form, and logic. The network form template comprises or has access to stateless view template 124. This stateless view template comprises rendering data (e.g., HyperText Markup Language—HTML) mapped to a representation of a network form governed by the network form template. The network form template and the stateless view template may be independent of a particular instance or change to an instance. In at least this way the templates may apply to multiple data instances 128.

Exemplary Stateless View Template

The following discussion describes an exemplary stateless view template. This exemplary stateless view template comprises rendering data usable to render multiple states (i.e., instances) of a network-enabled electronic form. The template's rendering data is associated with a view-oriented representation of the form. The view-oriented representation may be mapped to a view tree for a particular data instance. The rendering data is independent of a particular data instance. For example, a piece of rendering data may be used to render a control of a data instance even if the control's data changes. Also, some pieces of rendering data may be reused. This permits the template to comprise a smaller amount of rendering data than is needed to render an entire data instance for a form.

Stateless view template 124 may comprise rendering data mapped to a representation of a network form that is enabled or governed by network form template 122. The representation of the network form may be oriented to the views permitted by the network form. It may not comprise logic, rules, and operations. The tools enable a full or partial view of an instance of the network form to be built from the pieces of rendering data in the stateless view template. By so doing, a network computer may forgo building a data-instance-specific file having rendering data, logic, and the like (e.g., a control tree) for each instance or change to an instance.

Figure 2:
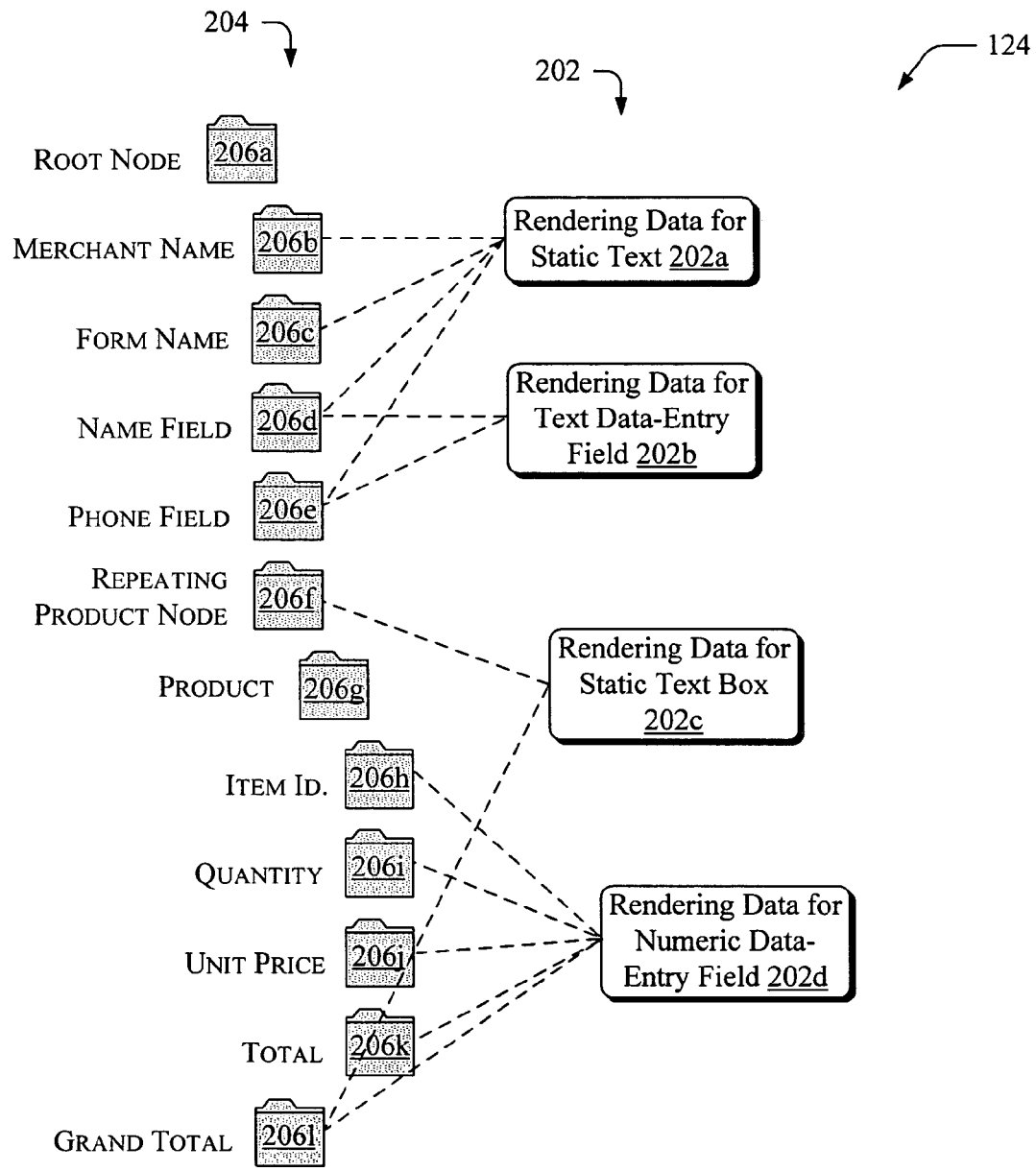
FIG. 2 illustrates an exemplary stateless view template.

Exemplary stateless view template 124 is illustrated in FIG. 2. FIG. 2 shows pieces of rendering data 202 mapped to a view-oriented representation 204 of a network form. The stateless view template has a hierarchical structure shown with the view-oriented representation and may be written in a markup language such as XML. The view-oriented representation 204 correlates to structures permitted for data instances of the network form. In this embodiment it does not comprise rules and logic for performing data operations and the like. It is instead directed to how instances may be viewed.

View-oriented representation 204 comprises nodes representing aspects (e.g., controls) permitted by the structure of the network form. These nodes include a root node 206a, a merchant name node 206b, a form name node 206c, a name field node 206d, a phone field node 206e, a repeating product node 206f, a product node 206g, an item identifier node 206h, a quantity node 206i, a unit price node 206j, a total node 206k, and a grand total node 206l. The repeating product node permits an arbitrary number of products, thereby permitting a user to enter information for many products. Thus, there may be "n" numbers of product nodes and child nodes of the product nodes: item identifier nodes; quantity nodes; unit price nodes; and total nodes.

The pieces of rendering data 202 comprise rendering data for static text 202a, rendering data for text data-entry fields 202b, rendering data for static text boxes 202c, and rendering data for numeric data-entry fields 202d. Each of these pieces 202a, 202b, 202c, and 202d comprise rendering data by which a browser, e.g., network browser 112, may render a portion of the data instance. Additional information may also be included that is consistent across instances, such as the text for the merchant name and form name. Thus, rendering data for static text 202a may comprise rendering data for static text generally and be associated with or comprise other information indicating that the static text for merchant name node 206b includes "Merchant" on a first line and "Seller of Quality Products for Twelve Years" on a second line, form name node 206c includes "Purchase Order", name field node 206d includes "Name", and phone field node 206e includes "Phone". The rendering data for static text may also comprise a font and font size for each. Note that none of the pieces of rendering data are redundant. In contrast, each of these pieces is usable for more than one node—though this is not required.

The piece of rendering data 202b for text data-entry fields comprises renderable data for boxes of a certain size capable of received alpha-numeric entries from a user of the form. The piece of rendering data 202c for static text boxes, like that of 202a, is for presentation of text, though here inside one or more boxes.

An exemplary diagram discussing some ways in which this stateless view template may be used is described below.

Building a Rendering File at a Local Computer

Figure 3:
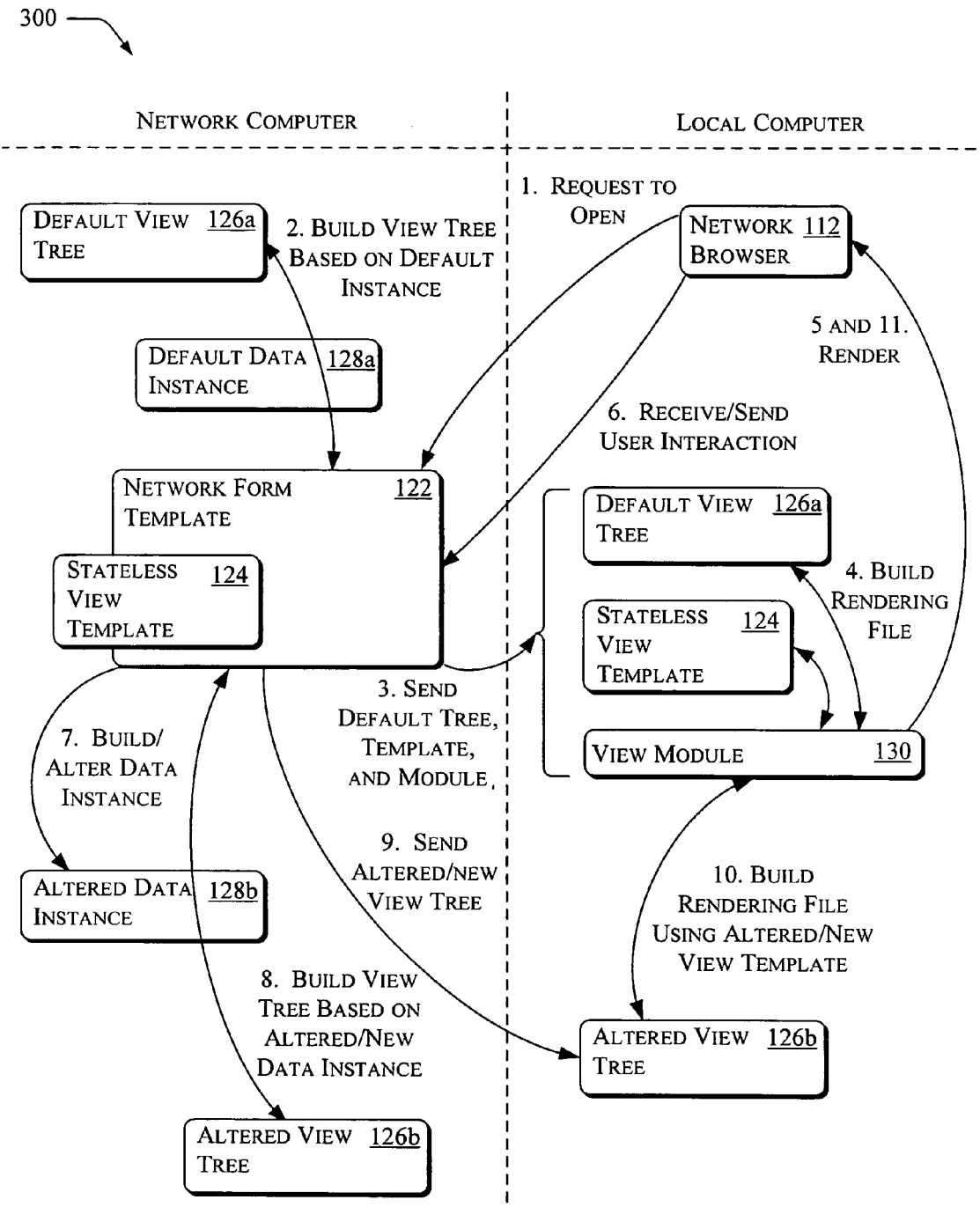
FIG. 3 is a flow diagram of an exemplary process for rendering network forms.

Flow diagram 300 shown in FIG. 3 describes exemplary ways in which the tools enable rendering of network forms with a rendering file built at a local computer. For purposes of illustration, flow diagram 300 is shown with a set of actions by, and accompanying communications between, elements of the environment 100, such as stateless view template 124 and view module 130. The actions and accompanying communications are marked with arrows. The flow diagram is directed to these elements to aid the reader in understanding particular embodiments of the tools, and is not intended to limit application of the tools to this environment. This flow diagram may be implemented in any suitable hardware, software, firmware, or combination thereof. In the case of software and firmware, this diagram represents sets of operations implemented as computer-executable instructions.

Arrow 1 receives and communicates a user's interaction with a computer requesting to open a network form. This request may be to open a blank or default instance of a network form or a data instance that has already been edited, like a previously opened and partly filled-in form. Here the request is received from network browser 112 of FIG. 1 and is for a default data instance (e.g., a new, blank form).

Figure 4:
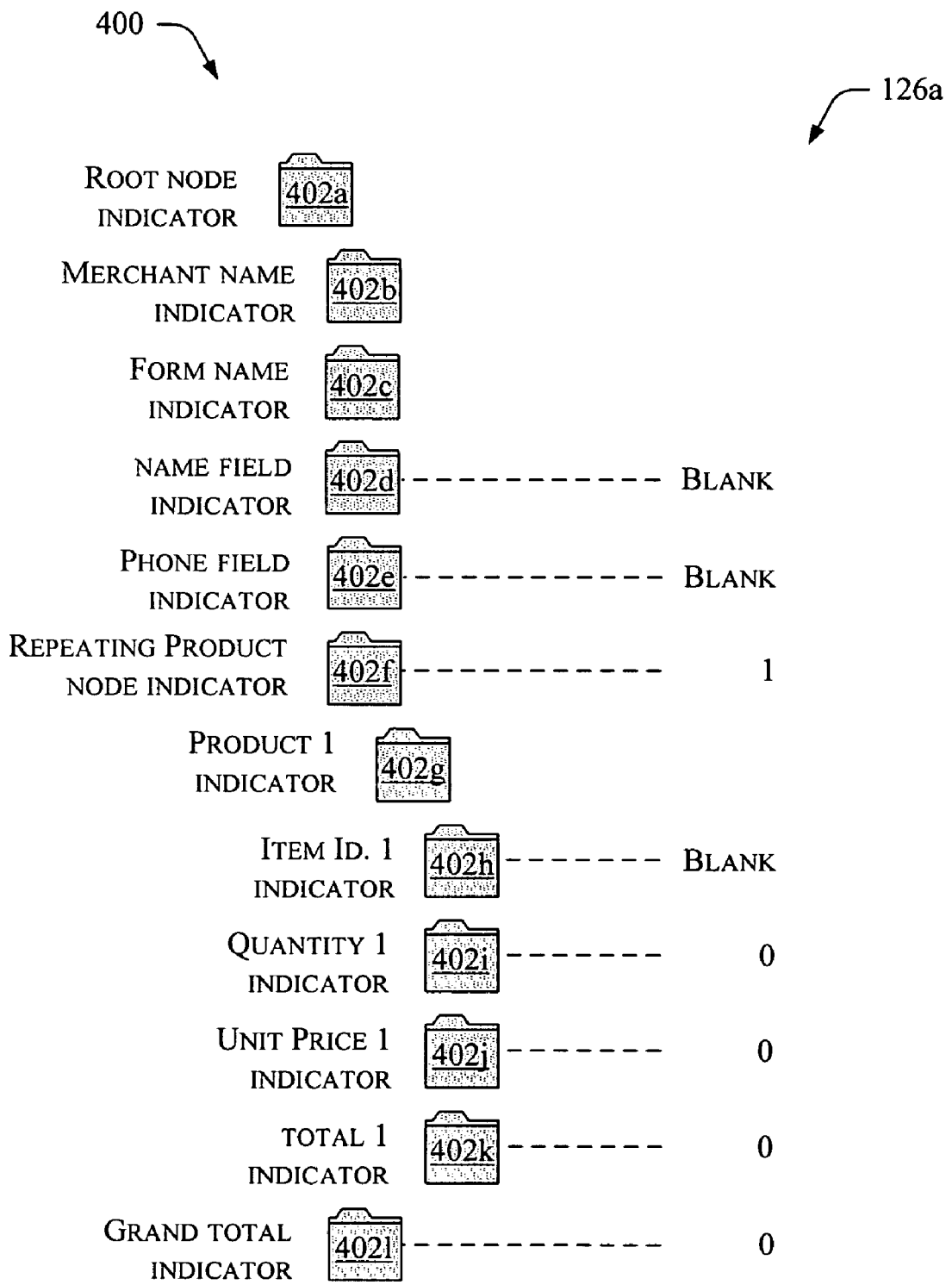
FIG. 4 illustrates an exemplary default view tree.

Arrow 2 builds a view tree for a default data instance of a network form. The view tree may be built mapped, or in some cases isomorphic, to a stateless view template. Here network form template 122 builds a default view tree 126a based on a default data instance 128a. The default view tree is shown in FIG. 4 at 126a having a hierarchical tree structure 400.

Default view tree 126a comprises indicators paralleling nodes of the view-oriented representation 204 of FIG. 2. These indicators comprise root node indicator 402a, a merchant name node indicator 402b, a form name node indicator 402c, a name field node indicator 402d, a phone field node indicator 402e, a repeating product node indicator 402f, a product 1 node indicator 402g, an item identifier 1 node indicator 402h, a quantity 1 node indicator 402i, a unit price 1 node indicator 402j, a total 1 node indicator 402k, and a grand total node indicator 402l. These indicators parallel the nodes of the view-oriented representation 204 of FIG. 2 that have similar names.

Each view tree comprises or is associated with data for a particular data instance. Default view tree 126a of FIG. 4 comprises data from default data instance 128a. This comprised data is data that may be viewed or affect data that may be viewed. This view tree indicates that the form tailored to the default instance is one in which there are no non-zero numbers or non-default text to display in the data-entry fields and that one repeating product node should be shown. The number "1" is associated with view tree indicator 402f, indicating that there is one repeating product node. A "blank" is associated with view tree indicators 402d, 402e, and 402h, indicating that data-entry fields for these should be displayed blank. A "0" is associated with each of the numerical data-entry fields 402i, 402j, 402k, and 402l, indicating that each of these data-entry fields should be displayed with a zero.

Each view tree can be quite small. In some embodiments a view tree does not comprise rendering data, data logic and operations, and the like. It can be significantly smaller than rendering data sufficient for a browser to render an entire form, thereby making communication of a view tree quicker and easier than this rendering data. View tree 126a shown in FIG. 4 comprises a data structure capable of being read by view module 130.

Arrow 3 sends a stateless view template, such as 124 shown in FIG. 1, a view module, such as view module 130, and a view tree, such as default view tree 126a to a user's computer. The stateless view template and view module may be sent to a user's computer once, usually the first time a user selects to open an instance of a network form. For any further edits and changes to a data instance, a view tree alone may be sent. Here computer 102 receives and caches to other media 116 of FIG. 1: stateless view template 124; view module 130; and default view tree 126a.

Arrow 4 builds a rendering file by which to render part or all of a data instance of a network form. Arrow 4 may do so by traversing a view tree and a stateless view template. The stateless view template, as discussed above, comprises rendering data by which an instance may be rendered. The view tree comprises indicators indicating which pieces of rendering data should be used by indicating which view tree nodes are associated with which piece of rendering data. The view tree also comprises information indicating what else should be displayed, such as a particular number or text. Arrow 4 traverses the view tree and the stateless view template in parallel, copying rendering data from the stateless view template and building it into a rendering file conforming to the view tree.

Figure 5:
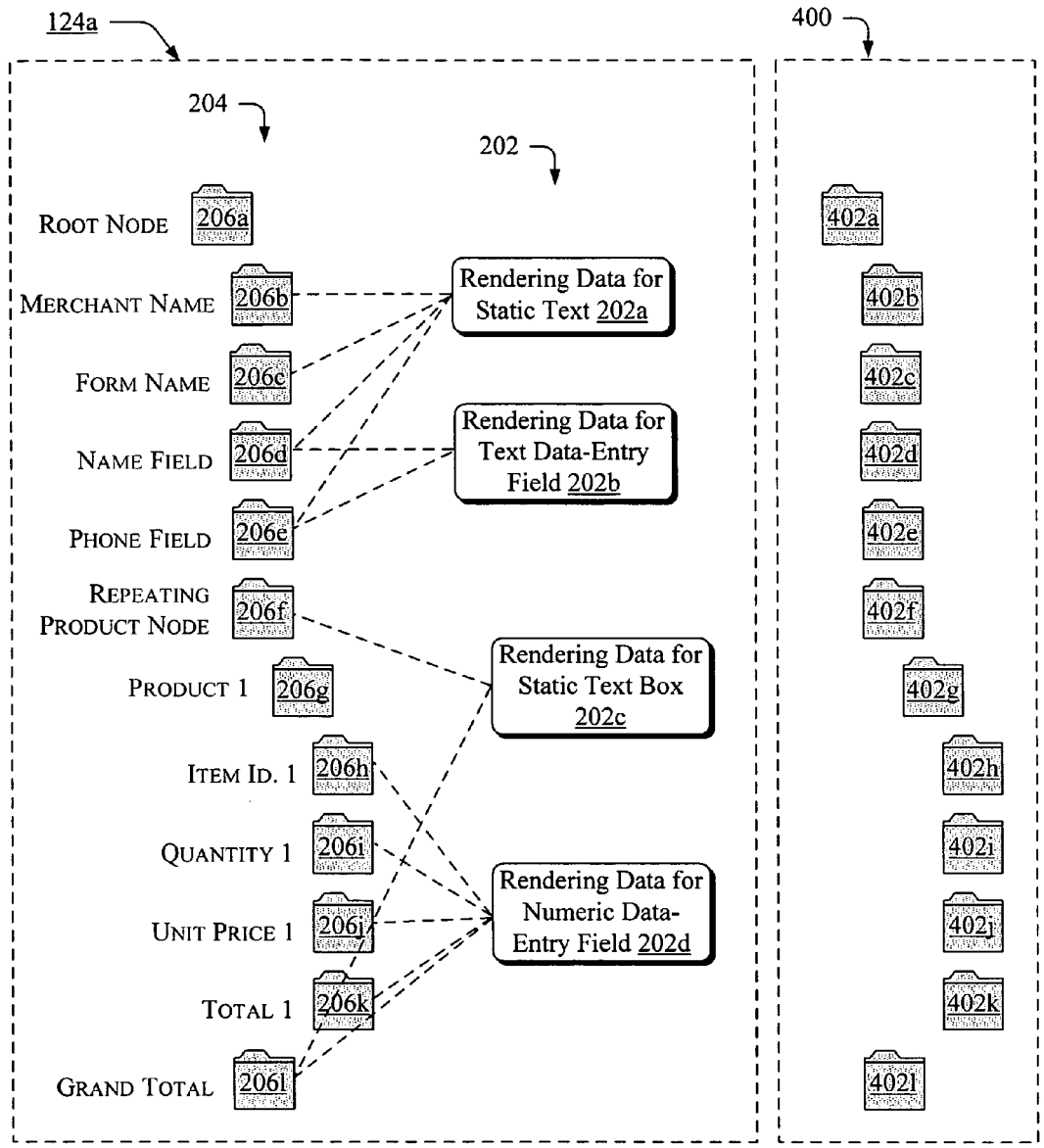
FIG. 5 illustrates the exemplary stateless view template of FIG. 2 and the exemplary default view tree of FIG. 4 (without showing default data).

Continuing the illustrated embodiment, view module 130 traverses stateless view template 124 and default view tree 126a. These are illustrated side-by-side in FIG. 5, showing the view template of FIG. 2 and default view tree 126a shown in FIG. 4 (without data and names). Here the pieces of rendering data 202 may be concatenated into a rendering file capable of rendering the entire data instance of the form. The concatenation in this case would be: 202a; 202a; 202a; 202b; 202a; 202b; 202c; 202d; 202d; 202d; 202d; 202c; and 202d. The structure of the concatenation is based on the indicators of the view tree corresponding to nodes of the view-oriented representation 204. These indicators show which of the rendering data pieces 202 correspond to the indicators of the view tree. In XML and HTML terms, this may be implemented by having unique identifiers in the rendering data, for example by using attributes in HTML and having a matching identifier in the data structure of the view tree.

Figure 6:
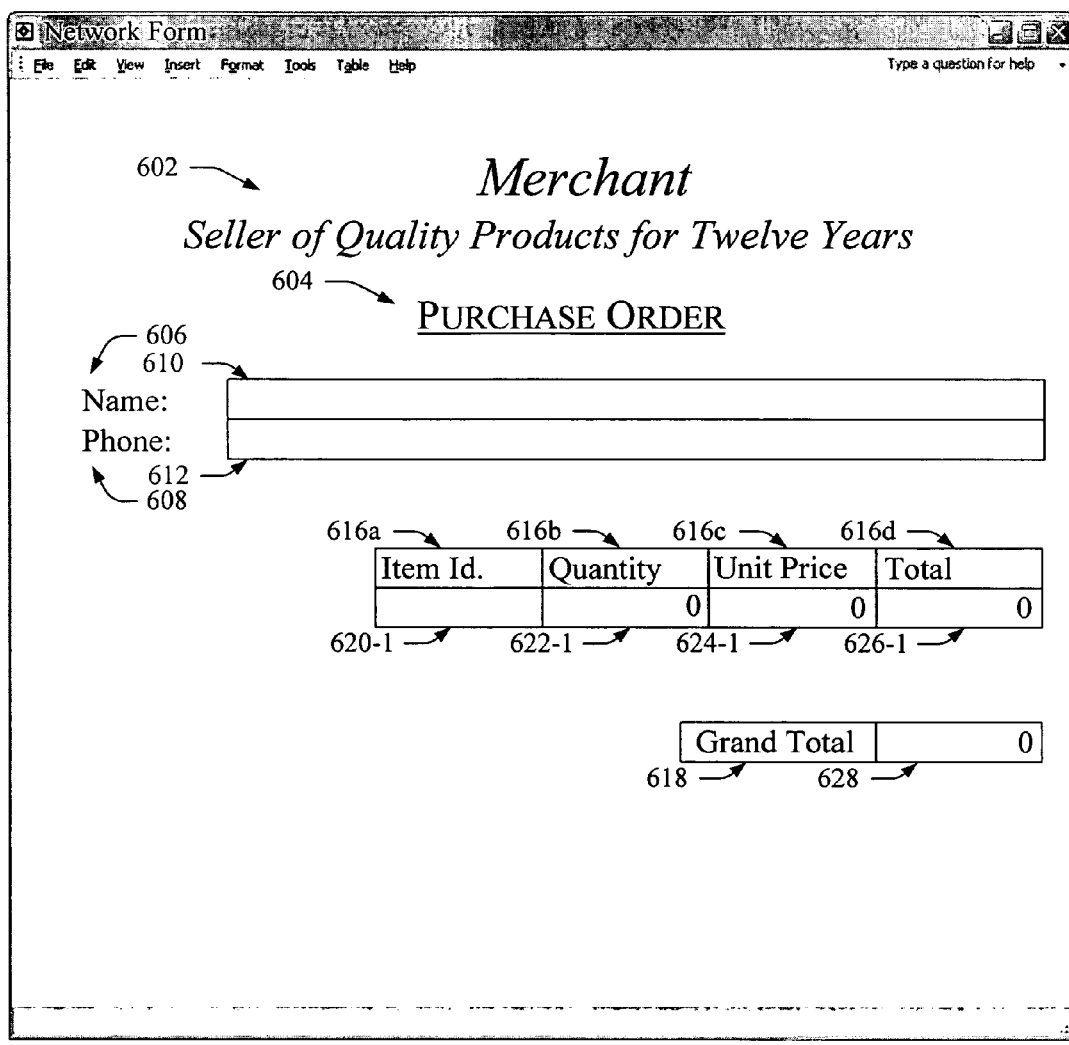
FIG. 6 shows a network form based on a default data instance.

Arrow 5 renders the data instance, such as by rendering the rendering file from arrow 4. Here network browser 112 renders the electronic form based on the default data instance. This is shown in FIG. 6. Here the information in the default view tree for certain data-entry fields being blank or having zeros is reflected in the data-entry fields of the form. Also, just one set of product nodes are shown, also as indicated by the "1" in the default view template of FIG. 4.

The default static text for merchant name node 206b, form name node 206c, name field node 206d, and phone field node 206e corresponding to indicators 402b, 402c, 402d, and 402e are shown rendered at 602, 604, 606, and 608 respectively. The default text for static text boxes of repeating product node 206f and 206l corresponding to indicators 402f and 402l are shown rendered at 616 (a-d) and 618, respectively. The default text of 616 is shown within four text boxes with "Item Id." in the first box 616a, "Quantity" within the second box 616b, "Unit Price" within the third box 616c, and "Total" within the fourth box 616d. The rendering data for static text box 202c may be repeated four times, once for each box with the difference being the text within each box and the location of the box on a display, or with one long, rectangular box divided into four parts. These rendering data 202c are also shown rendered in FIG. 6 with text for grand total node 206l having a box with "Grand Total" at 618.

The piece of rendering data 202d for numeric data-entry fields is also rendered in FIG. 6. Rendering data 202d is mapped to each of the child nodes of product 1 node 206g, and grand total node 206l. Each is shown (by default and with no entry) at 620-1, 622-1, 624-1, and 626-1, the "−1" indicating that each of these data-entry fields so rendered are associated with child nodes of product 1 node 206g. This rendering data 202d is also mapped to grand total node 206l and is rendered at 628.

Arrow 6 receives a user's interaction capable of causing a network-dependent change to a current instance of a network form and communicates this interaction to a network computer. Here the illustrated default data instance of the form is displayed, through which a user may interact with the form, such as through network browser 112. In doing so, the user may enter data, select a control, and the like. Some user interactions with a form may not immediately require submittal of interaction to the network computer. In this case we assume that entry of a user's name into data-entry field 610, phone number into phone data-entry field 612, and product information into data-entry fields 620-1 and 622-1 do not cause a submittal of the form. We assume, however that a user's interaction entering a unit price into data-entry field 624-1 does cause a submittal.

The network browser receives the user's interactions and records them into event log 114. The user's interaction can be recorded exactly—such as selecting a particular control on a form or keying in a certain number into a certain data-entry field. The event log is then sent (at Arrow 6) to network computer 106 over communications network 104.

Assume the following user interactions lead up to submittal: a user enters his name "Benjamin T. Jorgens" and phone number "206-555-1212" into name field 610 and phone field 612; and numbers "13492", "2", and "13.56" into the product 1 data-entry fields 620-1, 622-1, and 624-1. These interactions of the user will alter the default data instance.

Arrow 7 creates or alters a data instance to reflect the user's interaction. Here network form template 122 alters the data instance to reflect the user's interactions recorded in event log 114. This may include the network form template performing operations responsive to the data changes and the like. Here network form template 122 performs operations effective to build a new data instance having the user's name and phone number, a total (27.12) for the first product by multiply the quantity (2) by the price (13.56), and a grand total (27.12). The network form template also builds the data instance to reflect another (blank) set of product nodes. This is an operation of the network form template adding product data-entry fields based on a user's interaction, such as when a product's item identification, quantity, and unit price data-entry fields for a last product in the form have been filled in by the user.

Arrow 8 builds a view tree reflecting an alteration to or a new data instance. Arrow 8 can build an entirely new view tree or one having just the changes made to the most recent data instance.

Here network form template 122 builds an altered view tree 126b, shown in FIG. 7. Note the added numbers from the data instance and the added indicators 702g, 702h, 702i, 702j, and 702k. These indicators reflect a change to the structure of the data instance, in this case to render and permit editing of a new set of product nodes. This exemplary view tree 126*b* comprises a data structure capable of being read by view module 130.

Building this view tree may require little memory and/or processing resources. It may also be smaller and more easily or quickly sent across a communication network than rendering information capable of rendering the altered data instance.

The network form template, at arrow 9, sends the altered/new view tree across the communication network to the user's computer.

Arrow 10 builds a rendering file by which to update the altered or new data instance of the network form. Here view module 130 builds a rendering file by which network browser 112 may rerender the altered data instance of the network form. View module 130 reuses stateless view template 124, traversing it and the altered view tree 126*b*.

Figure 8:
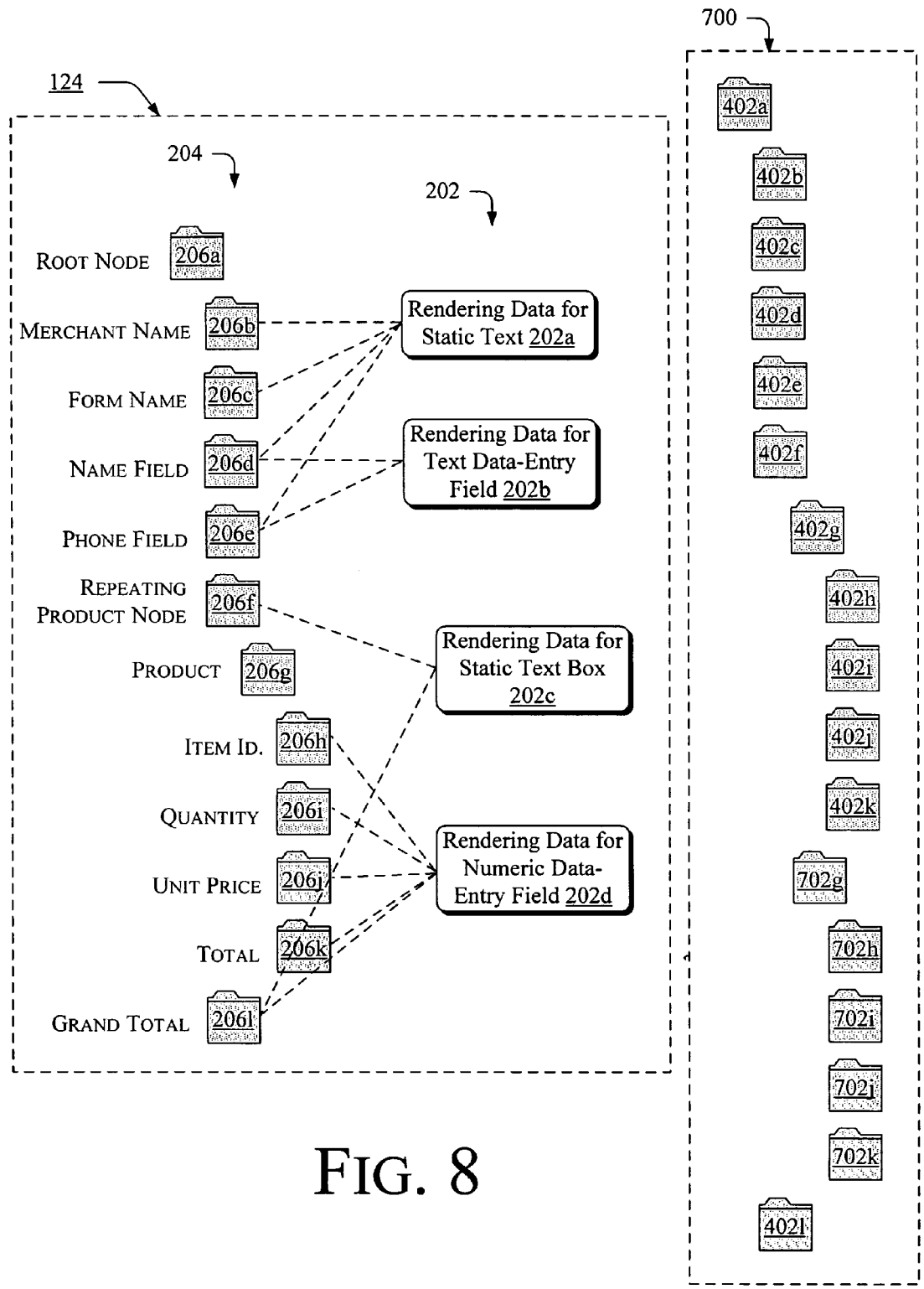
FIG. 8 illustrates the exemplary stateless view template of FIG. 2 and the exemplary altered view tree of FIG. 7 (without showing data).

FIG. 8 shows the view template of FIG. 2 and view tree 126*b* shown in FIG. 7 (without data and names). Here the pieces of rendering data 202 are concatenated into a rendering file capable of rendering the entire data instance of the form. The concatenation in this case is: 202*a*; 202*a*; 202*a*; 202*b*; 202*a*; 202*b*; 202*c*; 202*d*; 202*d*; 202*d*; 202*d*; 202*d*; 202*d*; 202*d*; 202*d*; 202*c*; and 202*d*. The concatenation is based on the indicators of the view tree corresponding to nodes of the view-oriented representation 204, thereby indicating which of the rendering data pieces 202 correspond to the indicators of the view tree. Note that the addition of another product node and its child nodes is reflected in repeating 202*d* four more times, one for each of the child nodes. Thus, when traversing the view tree and the template in parallel, the view module repeats the traversal of nodes 206*g* to 206*k* of the template, for the second set of product nodes in the view tree (702*g* to 702*k*).

Arrow 11 renders the form showing the alteration to the form's data instance. In the ongoing example, network browser 112 renders the rendering file built at arrow 10. This is shown in FIG. 9. FIG. 9 shows two sets of product nodes—the first with the numbers previously entered by the user and the second blank or zero. The additional product nodes of the altered data instance are reflected in the rendering file and thus the rendered view showing blank product nodes at 620-2, 622-2, 624-2, and 626-2. The other changes to the data instance are also rendered based on the view tree—the name, phone number, item identification, quantity, unit price, and total for product 1. The grand total is also rendered, here 27.12 (27.12+0).

In these exemplary embodiments, a network computer prepares files usable by a local computer to build rendering data sufficient for a network browser to render a network form. In so doing, a network computer may use fewer of its own resources and those of a communication network.

Building a Rendering File Using a Stateless View Template

The above-described exemplary flow diagram describes exemplary ways in which the tools enable a local computer to render a network form by building a rendering file using a stateless view template. The following process further describes and provides additional embodiments of the tools, including embodiments in which a rendering file is built at a network computer and then communicated to a local computer.

Figure 10:
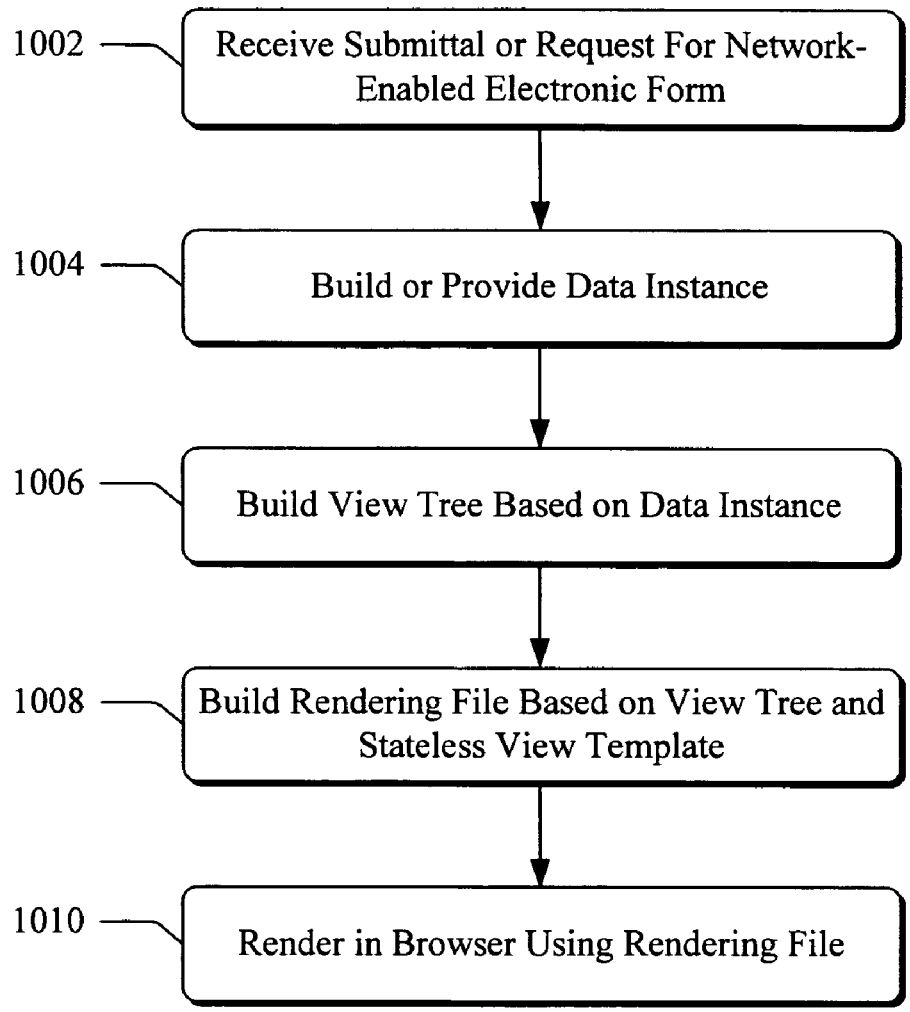
FIG. 10 is an exemplary process for enabling a local computer to render a network form.

Referring to FIG. 10, a process 1000 for enabling a local computer to render a network form is shown. This process may be implemented in any suitable hardware, software, firmware, or combination thereof. In the case of software and firmware, this process represents sets of operations implemented as computer-executable instructions.

Block 1002 receives a user-initiated request related to a network-enabled electronic form, such as to alter or open a data instance of the form. This request may be to submit an interaction capable of altering an existing data instance. These alterations may be those that simply add data to a data instance, require a structural change to a data instance, or require performance of operations at a network computer in order to properly alter the data instance based on the user's interaction. Exemplary alterations are shown as part of the exemplary flow diagram 300 in FIG. 3: a structural alteration with addition of a second product; a data-only alteration with entry of a user's name; and a logic operation computing a total and grand total based on entry of a product's quantity and price.

Block 1004 builds or provides a data instance. This data instance may be a provided default data instance, such as 128*a* described above. The data instance may also be one reflecting a user-initiated request. In this case the data instance may comprise an existing data instance after it has been altered to reflect the user's interaction, such as is set forth above at arrow 7 of flow diagram 300. The data instance may also reflect the current state of the data instance by being built based on the most recent and prior user-initiated requests.

Block 1006 builds a view tree based on the data instance. The view tree is view and data-dependent; it reflects that part of the data instance that may affect how a form is rendered. Block 1006 may build the view tree capable of being traversed in parallel with a stateless view template having pieces of rendering data. These pieces of rendering data may be built into a rendering file capable of being rendered by a browser, such as network browser 112.

In one embodiment a network computer builds the view tree. This enables, for example, the network computer to receive an edit to a network form, alter a data instance to reflect that edit, and then build the view tree to reflect the altered data instance. One example of this is set forth as part of arrows 6, 7, 8, and/or 9 in flow diagram 300. By so doing the network computer may act to manage the form; this allows greater control of a form and various data instances for the form. It also permits many local computers to use the form without them having to download extensive software to manage each instance of the form. As will be discussed below, in one embodiment a local computer downloads a relatively small software module, which can be orders of magnitude smaller than all the software (e.g., network form template 122) used by the network computer.

Block 1008 builds a rendering file based on a view tree and a stateless view template. Block 1006 may build a view tree capable of being traversed in parallel with a stateless view template. The view tree and stateless view template act in conjunction to map data to rendering data.

In the exemplary embodiment above, stateless view template 124 can be capable of providing rendering data for rendering all possible instances of a network form. It also comprises rendering data mapped to a view-oriented representation of a network form enabled by network form template 122. The view tree has a parallel (but not necessarily identical) structure to that of the stateless view template effective to enable appropriate rendering data of the stateless view template to be found. This rendering data may be collected into a rendering file for rendering by a browser. The rendering file may comprise sufficient rendering data to render the entire form based on its current data instance or a portion of it. In some cases only rendering data reflecting a change from that of a currently rendered data instance is collected into a file for rendering.

In some embodiments, a local computer builds a rendering file. One such example of this is set forth as part of flow diagram 300. Here a software module at a local computer is used to traverse a stateless view template and a view tree. This software module may be quite small. This enables it to be sent to the local computer without using extensive resources of the local computer, network computer, or communication network. It may also be smaller in size that a file capable of rendering the form. Sending a stateless view template and a software module (e.g., stateless view template 124 and view module 130 of FIG. 1) once, and a view tree for each data instance change may, in some cases, require significantly fewer resources than sending a rendering file for every data instance change.

In another embodiment, a network computer builds a rendering file. In this case the network computer builds a view tree for a data instance change and, based on the view tree and the stateless view template, builds the rendering file. The resources needed by the network computer to build a view tree for each data change and, based on the view tree, build a rendering file to render the change or the whole form, may be significantly less than that required by building one or more control trees for each data change. Thus, even if the network computer builds the rendering file and sends it to a local computer, it may require relatively few resources. This permits a local computer to not download a software module or stateless view template for building a rendering file. Instead the network computer may send a rendering file capable of being rendered by a bare network browser (e.g., network browser 112).

Block 1010 uses the rendering file to render the form in the browser. In the illustrated embodiments of flow diagram 300 a local view module 130 uses the rendering file to render in the browser. In one of the embodiments described herein, the rendering file is sent by the network computer (e.g., view module 130 at network computer 106) to the network browser and is rendered by the network browser. In each case the user can then view and edit the form. With additional user interactions, the tools may re-perform blocks 1002, 1004, 1006, 1008, and 1010.

CONCLUSION

Systems and/or methods are described that enable an electronic form to be rendered using a template. The template may be independent of the electronic form's current state or instance, permitting the template to apply to multiple data instances of the electronic form. Using this template, different data instances may be rendered often with relatively few processing and memory resources. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    receiving a user-initiated request to alter an existing data instance of a network-enabled electronic form;
    altering the existing data instance based on the user-initiated request to provide an altered data instance;
    building a view tree based on the altered data instance;
    communicating the view tree and a stateless view template to a local computer from which the user-initiated request is received, the stateless view template comprising rendering data to render the electronic form, and the view tree comprising indicators that associate one or more nodes in the view tree with one or more pieces of rendering data in the stateless view template, wherein the view tree has a parallel structure to the stateless view template, and wherein a rendering file conforming to the view tree can be built by traversing the view tree in parallel with the stateless view template, copying the rendering data from the stateless view template, and building the copied rendering data into the rendering file conforming to the view tree.

2. The method of claim 1, wherein the act of building the rendering file is performed by a network computer and further comprising communicating the rendering file to a local computer from which the user-initiated request is received.

3. The method of claim 1, further comprising communicating a software module to the local computer from which the user-initiated request is received, the software module capable of building the rendering file.

4. The method of claim 3, wherein the software module is further configured to build the rendering file by traversing the view tree and the stateless view template.

5. The method of claim 1, wherein the user-initiated request is to alter a structure of the existing data instance.

6. The method of claim 1, wherein the user-initiated request requires performance of an operation at a network computer to effectuate the altering of the existing data instance.

7. The method of claim 1, wherein the act of altering the existing data instance comprises performing a logic operation on the existing data instance.

8. The method of claim 1, wherein the act of altering the existing data instance comprises altering the existing data instance's structure.

9. One or more computer-readable media having computer-readable instructions therein that, when executed by a computing device, cause the computing device to perform acts comprising:
    sending a user-initiated request requiring alteration to an existing data instance of a network-enabled electronic form;
    receiving a view tree based on a data instance reflecting an alteration to the existing data instance required by the user-initiated request and receiving a stateless view template, the stateless view template comprising rendering data to render the data instance, and the view tree comprising indicators that associate one or more nodes in the view tree with one or more pieces of rendering data in the stateless view template, wherein the view tree has a parallel structure to the stateless view template; and
    building a rendering file conforming to the view tree having the pieces of rendering data that can render the data instance by traversing the view tree in parallel with the stateless view template, copying the rendering data from the stateless view template, and building the copied rendering data into the rendering file conforming to the view tree.

10. The media of claim 9, further comprising rendering the rendering file.

11. The media of claim 9, further comprising receiving a software module capable of building the rendering file.

* * * * *